United States Patent
Staley et al.

(10) Patent No.: US 9,659,414 B2
(45) Date of Patent: May 23, 2017

(54) CONTROL METHODOLOGY FOR WIRELESS FLUID LEVEL SENSOR

(71) Applicant: GM Global Technology Operations LLC, Detroit, MI (US)

(72) Inventors: David R. Staley, Flushing, MI (US); Karl R. Gilgenbach, Rochester Hills, MI (US); Eric W. Schneider, Shelby Township, MI (US); Bryant G. Hammond, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 14/601,760

(22) Filed: Jan. 21, 2015

(65) Prior Publication Data

US 2016/0210793 A1     Jul. 21, 2016

(51) Int. Cl.
  *G07C 5/00* (2006.01)
  *H04Q 9/00* (2006.01)

(52) U.S. Cl.
  CPC .............. *G07C 5/006* (2013.01); *H04Q 9/00* (2013.01); *H04Q 2209/40* (2013.01); *H04Q 2209/883* (2013.01)

(58) Field of Classification Search
  CPC ........ F01M 11/12; F01M 11/04; G07C 5/006; G07C 5/00; G06F 23/00; B60R 16/023
  USPC .............................. 701/2, 29.05, 29.4; 73/647
  See application file for complete search history.

(56) References Cited

U.S. PATENT DOCUMENTS

| | | | |
|---|---|---|---|
| 5,274,335 A | 12/1993 | Wang et al. | |
| 6,208,245 B1* | 3/2001 | Post | B60R 16/0232 340/438 |
| 6,508,100 B2* | 1/2003 | Berndorfer | G01N 33/2888 73/1.02 |
| 6,677,854 B2* | 1/2004 | Dix | G07C 5/008 340/426.24 |
| 6,799,458 B2* | 10/2004 | Ismail | G01F 23/265 361/284 |
| 7,854,127 B2 | 12/2010 | Brown | |
| 2008/0059476 A1* | 3/2008 | Alrabady | G07C 5/008 |
| 2009/0000406 A1* | 1/2009 | Brazier | F16K 17/1626 73/865.8 |
| 2013/0074604 A1* | 3/2013 | Hedtke | G01L 19/0061 73/753 |
| 2015/0199854 A1* | 7/2015 | Olsen, III | G06Q 10/06 701/29.3 |

* cited by examiner

*Primary Examiner* — Tan Q Nguyen
(74) *Attorney, Agent, or Firm* — Harness, Dickey & Pierce, P.L.C.

(57) ABSTRACT

A control methodology for a wireless oil level sensor includes mounting a wireless oil pressure sensor to the oil plug of an engine. The oil pressure sensor detects a pressure which is used to determine a volume or level of oil in the oil pan. The oil level sensor can include an accelerometer sensor that can be excited by the vibration caused by the starting of the engine to "wake up" the sensor. The sensor can take an initial pressure reading at start up and associate the pressure reading with an oil level that can then be transmitted to a vehicle control unit. The sensor can remain idle until the accelerometer sensor no longer detects engine vibrations. The sensor is activated to take pressure readings at predetermined time intervals and to transmit an associated oil level to the vehicle central processor unit until a predetermined time period has expired.

12 Claims, 1 Drawing Sheet

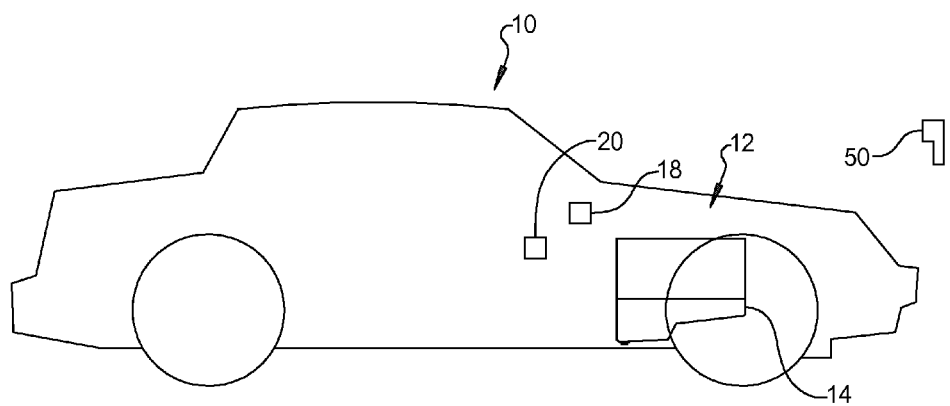
FIG 1
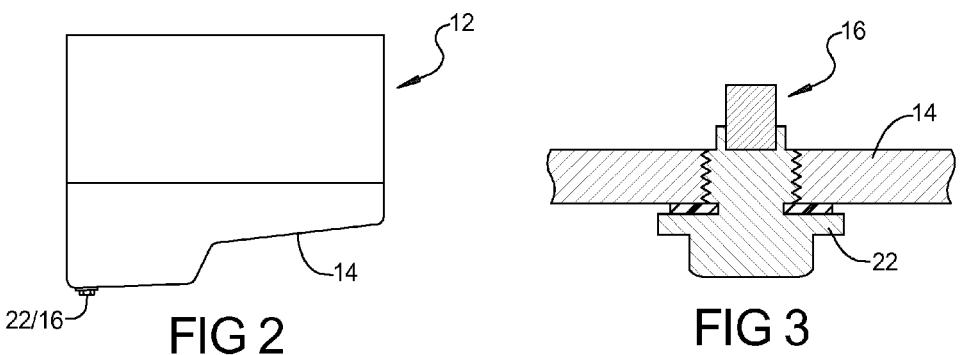
FIG 2
FIG 3
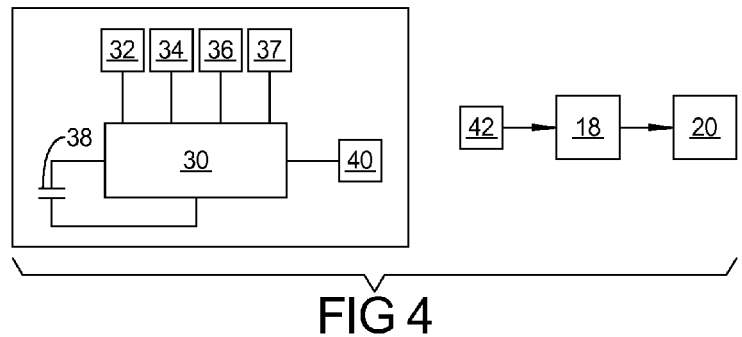
FIG 4

CONTROL METHODOLOGY FOR WIRELESS FLUID LEVEL SENSOR

FIELD

The present disclosure relates to a control methodology for a wireless fluid level sensor and more particularly to a wireless oil level sensor for an internal combustion engine.

BACKGROUND AND SUMMARY

This section provides background information related to the present disclosure which is not necessarily prior art.

It is important to maintain a proper amount of oil in an engine in order for the engine to be properly lubricated. Typically, engines are equipped with a dipstick that is manually removed from an engine in order to observe the oil level of the oil on the dipstick. Although the oil dipstick is a reliable method of detecting the oil level, it requires that the vehicle operator open the vehicle hood and pull the dipstick out of the engine. Optional engine oil switches exist that notify an operator that the oil level is low. These oil switches have to be wired into the vehicle and fixedly mounted within the oil pan at a level representative of a minimum level at which the user needs to be notified of the low oil condition. Therefore, the typical oil level sensor is only useful for providing a low oil indicator when a low oil condition exists.

The present disclosure provides implementation and a control methodology of a wireless oil level sensor. The control methodology includes mounting a wireless oil pressure sensor to the oil plug of an engine. The oil pressure sensor detects a pressure which can then be used to determine a volume or level of oil above the sensor. The oil level sensor can include an accelerometer sensor that can be excited by the vibration caused by the starting of the engine to "wake up" the sensor. The sensor can take an initial pressure reading at start up and associate the pressure reading with an oil level that can then be transmitted to a vehicle control unit. The sensor can remain idle until the accelerometer sensor no longer detects engine vibrations at which time the sensor is activated to take pressure readings at predetermined time intervals and to transmit an associated oil level to the vehicle central processor until a predetermined time period has expired. The oil sensor then goes into sleep mode in order to maximize battery life.

According to another aspect of the present disclosure, the oil sensor can further be utilized to detect an oil change condition and report the oil change condition to the vehicle control unit so that the oil life monitor can be automatically reset without requiring any input from the vehicle operator.

According to a further aspect of the present disclosure, the oil sensor can be utilized to estimate crankcase pressure during engine operation to help service technicians determine if the crankcase ventilation system or piston rings are operating properly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a vehicle having an engine with a wireless oil sensor disposed in the oil pan according to the principles of the present disclosure;

FIG. 2 is a schematic view of an engine with the wireless oil sensor disposed in the oil pan according to the principles of the present disclosure;

FIG. 3 is a schematic view of the oil sensor mounted to the oil plug received in the oil pan; and FIG. 4 is a schematic diagram illustrating the communication between the wireless oil sensor and a vehicle control unit according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

With reference to FIG. 1, a vehicle 10 is shown including an engine 12 having an oil pan 14 with an oil sensor 16 disposed in the oil pan. The oil sensor 16 can provide wireless signals to the vehicle central processor unit 18 which can display information to the vehicle operator via a vehicle display unit 20. FIG. 2 shows a larger more detailed view of the engine 12 oil pan 14 with the oil sensor 16 disposed in the oil pan plug 22. FIG. 3 shows a larger more detailed view of the oil pan plug 22 disposed in a threaded opening 24 in the bottom of the oil pan 14 and with the oil sensor 16 mounted to the oil pan plug 22.

FIG. 4 provides a schematic illustration of the components of the wireless oil sensor 16 for communication with the vehicle central processor unit 18. The wireless oil sensor 16 includes a sensor central processor unit 30 that is in communication with a plurality of sensors that can include a pressure sensor 32, temperature sensor 34, an accelerometer sensor 36, and an attitude sensor 37. Additional sensors can be utilized. A battery 38 is provided for providing power to the wireless oil sensor 16 and an RF transceiver 40 is provided for providing signals to and transmitting signals from the central processor unit 30. The RF transceiver 40 is capable of transmitting signals to an RF transceiver 42 of the vehicle central processor unit 18 as well as receiving signals from the RF transceiver 42 or from other programming tools 50 (FIG. 1).

The sensor function begins with the sensor in a sleep mode when the engine is off. When the "Key" is turned "on" or the engine is otherwise caused to turn over, the accelerometer sensor 36 is excited by the vibration of the engine and it causes the oil sensor 16 to switch to an operation/awake mode. The oil sensor 16 then immediately reads the temperature and pressure within the oil pan 14 and can convert those temperature and pressure readings into a corresponding oil level (L) at start-up. It is noted that for purposes of the discussion herein, the oil level L and sensed pressure P are used somewhat interchangeably since the sensed pressure generally corresponds to a certain oil level. Optionally, oil level can be converted to oil mass by assuming a known oil density and correcting for temperature. The sensor readings are required to be taken right away before engine operation causes the oil to be dispersed throughout the lubrication system of the engine so that the level of oil in the oil pan 14 is not representative of the amount of oil that is typically measured when the engine is off. The sensor readings are also required before the oil crankcase atmospheric pressure is affected by the engine operation. During the remaining engine operation cycle, the oil sensor 16 can remain idle.

When the key is turned "off" or the engine is otherwise turned off, the excitation of the accelerometer sensor 36 is stopped. After the oil sensor 16 detects that the engine vibration has stopped via the accelerometer sensor 36, the oil sensor central processor unit 30 initiates a clock and begins sampling the oil level at predetermined increments for a predetermined period of time. By way of non-limiting example, the predetermined increments can be 10 sec increments and the predetermined period of time can be determined based upon a typical amount of time for a majority of the engine oil to return to the oil pan 14. This time period can range from 1 minute to several minutes for different engine designs. The oil sensor central processor unit 30 can correct the oil level for temperature and optional volume variations or mass and transmit the oil level/volume for each level read to the radio frequency transceiver 42 of the vehicle central processor unit 18. After the predetermined time period has expired, the oil sensor 16 returns to sleep mode.

The control method of the wireless oil sensor 16 enables the wireless sensor 16 to act autonomously in its environment. The wireless oil sensor is capable of sensing its own environment and can be selectively energized to measure the fluid level when it is possible for accurate measurement. The battery life of the oil sensor is maximized due to the selective operation. The control methodology of the present disclosure enables the use of a wireless engine oil level sensor and has the potential to replace the current oil level dipstick and low oil switch used in present vehicles. The system can result in cost reduction, improved oil level measurement accuracy, improved customer convenience by allowing accurate oil level information to be displayed on a vehicle display 20. The attitude sensor 37 can be utilized to adjust the oil level reading for tilt if the vehicle is parked on a hill. Therefore, a false low oil level indication can be avoided.

A further feature of the present disclosure is the ability to use the wireless oil sensor 16 to include an algorithm to recognize the environmental conditions that are unique to an oil change. In general, it is recognized that an oil level changes very slowly throughout the operation of a vehicle whereas an oil change will induce a change in oil level over a very short period of time. The oil sensor 16 is able to recognize an oil change event and communicate to the vehicle central processor unit 18. In particular, according to one aspect of the present disclosure, the oil sensor 16 can calculate a change in oil level with respect to time (dL/dT) and determine if the value of dL/dT is less than 0 and its absolute value is greater than a threshold value, then an oil change event is identified. In other words, in the event the oil sensor 16 is mounted to the oil plug 22, removal of the oil plug and oil sensor 16 will result in the oil sensor being activated from sleep mode by the accelerometer being excited due to the rotation and removal of the oil plug 22. Once the oil plug 22 and oil sensor are removed from the oil pan, the oil sensor 16 will recognize an immediate drop in pressure since the pressure sensor 32 is now exposed to ambient pressure. The drop in pressure can be identified as an oil change event that can be identified to the vehicle central processor unit 18 which can either automatically update the vehicle database of the current oil change event or to prompt the vehicle operator via the display 20 to confirm that an oil change is or has been performed. As an alternative, the attitude sensor 37 can be used to detect that the oil plug was removed to signal that an oil change is being performed. The removal of the oil plug would alter the attitude of the oil plug and allow the vehicle central processor unit to discern that an oil change is being performed.

If the oil sensor 16 is not mounted to the oil plug 22, but is otherwise mounted within the oil pan 14, the oil sensor 16 will recognize a rapid decrease in pressure over time (dL/dT) as the oil drains from the oil pan 14. The rapid decrease in pressure over time can be determined to be representative of an oil change event that can be identified to the vehicle central processor unit 18 which can either automatically update the vehicle database of the current oil change event to reset the oil life monitor or to prompt the vehicle operator via the display 20 to confirm that an oil change is or has been performed, and then, if confirmed, can reset the oil life monitor.

According to an alternative oil change check function, a repetitive knocking on the surface of the oil plug 22 in close proximity to the oil sensor 16 can be recognized by the accelerometer sensor 36 and the oil sensor 16 can transmit to the vehicle central processor unit 18 signaling an oil change event in progress. The repetitive knocking can be representative of a wrench engaging the oil plug 22 or another forced pattern that the oil change technician carries out. A repeated knocking pattern (either via re-installation of the oil plug 22 or a forced pattern carried out by the oil change technician) can then be recognized by the accelerometer 36 and the oil sensor 16 can transmit information to the vehicle central processor unit 18 to signal that the oil change event is complete so that the oil life monitor can be automatically reset, either with or without confirmation of the oil change event with the vehicle operator. The oil change detection feature provides a means by which the oil life monitor on a vehicle can be automatically reset rather than requiring vehicle operator input.

According to a further aspect of the present disclosure, the oil sensor 16 located in the oil pan drain plug 22 can be used to estimate crankcase pressure during various operating conditions of the engine to determine if the ventilation system or piston rings are operating properly. Service technicians currently have to install a separate blow-by measuring device onto the engine to determine if the piston rings are not sealing properly. Service technicians also have no means of measuring the crankcase pressure to determine if the ventilation system is operating correctly. The use of the oil sensor 16 to estimate the pressure during engine operation eliminates the need to install a separate crankcase pressure sensor and/or a blow-by measurement device, which saves labor and diagnosis time. In order to use the oil sensor 16 for detecting engine operating conditions, the technician starts the engine and lets it idle. The technician uses a hand held signal monitoring device 50 (FIG. 2) or vehicle display FIG. 2 to read a pressure output from the oil sensor 16. By way of non-limiting example, pressure values lower than a normal predetermined value (e.g. −4 kPa) can indicate that the crankcase pressure regulation valve is stuck in an open position and requires service. Pressure values higher than a normal predetermined value (e.g. 3 kPa) indicate that the piston rings are not sealing properly or the pressure regulation valve is stuck closed. Accordingly, the oil pressure sensor in the oil pan can be used by service technicians to diagnose engine problems.

An alternative to the technician activating the sensor using a signal monitoring device, is an "automated mode" that detects crankcase pressure periodically during engine operation and reports to the engine central processor unit 18. The central processor unit 18 captures the signal and determines if the engine is in the required "standard" condition (e.g., warm idle). If so, the central processor unit 18 checks for pressure values being in the "normal" window. If not, the central processor unit 18 provides a signal to notify the operator of possible maintenance requirements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling a wireless fluid level sensor in an engine of a vehicle, comprising:
   mounting a wireless fluid level sensor in an oil pan of a vehicle, said wireless fluid level sensor including a pressure sensor, an accelerometer sensor, a battery and a transmitter;
   waking the wireless fluid level sensor in response to the excitation of the accelerometer sensor caused by the starting of the engine and reading a pressure level and transmitting an oil level indicative of the pressure level to a vehicle controller.

2. The method according to claim 1, further comprising maintaining the sensor in an idle state until the accelerometer sensor no longer detects engine vibrations and then activating the pressure sensor to take pressure readings at predetermined time intervals and transmitting an associated oil level to the vehicle controller until a predetermined time period has expired.

3. The method according to claim 2, wherein after the predetermined period of time, the wireless fluid level sensor then goes into sleep mode.

4. The method according to claim 1, wherein said wireless fluid level sensor is mounted to an oil plug.

5. A method for detecting an oil change condition with a wireless fluid level sensor in an engine of a vehicle, comprising:
   mounting a wireless fluid level sensor in an oil pan of a vehicle, said wireless fluid level sensor including a pressure sensor, an accelerometer sensor, a battery and a transmitter;
   waking the wireless fluid level sensor in response to the excitation of the accelerometer sensor;
   detecting a rate of change of pressure by the pressure sensor and determining if the rate of change of the pressure is indicative of an oil change condition;
   transmitting a signal from the wireless fluid level sensor to a vehicle control unit to indicate that an oil change condition has been detected; and
   re-setting an oil life monitor status of the vehicle control unit in response to the signal from the wireless fluid level sensor.

6. The method according to claim 5, wherein said wireless fluid level sensor is mounted to an oil plug.

7. A method for detecting an oil change condition with a wireless fluid level sensor in an engine of a vehicle, comprising:
   mounting a wireless fluid level sensor in an oil pan of a vehicle, said wireless fluid level sensor including an accelerometer sensor, a battery and a transmitter;
   waking the wireless fluid level sensor in response to the excitation of the accelerometer sensor;
   detecting a series of knocks via the accelerometer sensor on the oil pan in close proximity to the wireless fluid level sensor indicative of an oil change condition;
   transmitting a signal from the wireless fluid level sensor to a vehicle control unit to indicate that an oil change condition has been detected; and
   re-setting an oil life monitor status of the vehicle control unit in response to the signal from the wireless fluid level sensor.

8. The method according to claim 7, wherein said wireless fluid level sensor is mounted to an oil plug.

9. A method for detecting an oil change condition with a wireless fluid level sensor in an engine of a vehicle, comprising:
   mounting a wireless fluid level sensor in an oil pan of a vehicle, said wireless fluid level sensor including a pressure sensor, an attitude sensor, a battery and a transmitter;
   detecting a change of attitude of the pressure sensor and determining if the change of attitude is indicative of an oil change condition;
   transmitting a signal from the wireless fluid level sensor to a vehicle control unit to indicate that an oil change condition has been detected; and
   re-setting an oil life monitor status of the vehicle control unit in response to the signal from the wireless fluid level sensor.

10. A method of diagnosing an engine condition with a wireless pressure sensor in an oil pan of an engine, comprising:
- mounting a wireless fluid level sensor in an oil pan of a vehicle, said wireless fluid level sensor including a pressure sensor, a battery and a transmitter;
- activating the wireless fluid level sensor using a signal monitoring device during engine operation to cause the wireless fluid level sensor to transmit a pressure signal to the signal monitoring device;
- receiving the pressure signal by the signal monitoring device; and
- determining whether the measured pressure is within a predetermined pressure range.

11. The method according to claim 10, wherein said wireless fluid level sensor is mounted to an oil plug.

12. A method of diagnosing an engine condition with a wireless pressure sensor in an oil pan of an engine, comprising:
- mounting a wireless fluid level sensor in an oil pan of a vehicle, said wireless fluid level sensor including a pressure sensor, a battery, and a transmitter;
- activating the wireless fluid level sensor during engine operation to cause the wireless fluid level sensor to transmit a pressure signal to the vehicle central processor unit; and
- determining whether the measured pressure is outside of a normal operating range for the engine operating state and, if not, providing a maintenance signal to a vehicle operator.

* * * * *